(12) United States Patent
Hwang et al.

(10) Patent No.: US 8,027,107 B2
(45) Date of Patent: Sep. 27, 2011

(54) CAMERA MODULE

(75) Inventors: Jung Wook Hwang, Gyunggi-do (KR);
Byung Hoon Kang, Seoul (KR); Jung Seok Lee, Gyunggi-do (KR); Dong Kyun Lee, Seoul (KR); Won Seob Oh, Gyunggi-do (KR); Jae Hyuk Park, Gyunggi-do (KR); Chuel Jin Park, Gyunggi-do (KR); Hyun Phill Ko, Gyunggi-do (KR); Soo Cheol Lim, Gyunggi-do (KR); Chul Yeub Han, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 12/582,241

(22) Filed: Oct. 20, 2009

(65) Prior Publication Data

US 2011/0043933 A1  Feb. 24, 2011

(30) Foreign Application Priority Data

Aug. 18, 2009  (KR) .................. 10-2009-0076267

(51) Int. Cl.
*G02B 7/02* (2006.01)
(52) U.S. Cl. ................................................ 359/824
(58) Field of Classification Search ........... 359/822–824
See application file for complete search history.

(56) References Cited

U.S. PATENT DOCUMENTS

2009/0268318 A1 * 10/2009 Woo et al. ................. 359/824

FOREIGN PATENT DOCUMENTS

KR  2008-0057117  6/2008

OTHER PUBLICATIONS

Office Action from counterpart Korean Patent Application No. 10-2009-0076267, Nov. 12, 2010, 4 pages,—no translation.

* cited by examiner

*Primary Examiner* — Alicia M. Harrington
(74) *Attorney, Agent, or Firm* — Blakely Sokoloff Taylor & Zafman LLP

(57) ABSTRACT

Disclosed herein is a camera module. The camera module includes a lens barrel having at least one lens which brings an image of a subject into focus. A housing having a space for the lens barrel, and friction member formed in axially. A piezoelectric actuator provided in an outer circumferential surface of the lens barrel, and generating vibration when external voltage is applied to the piezoelectric actuator, with a through hole formed for having the friction member. An elastic member include the friction member, and inserted into the through hole of the piezoelectric actuator, and applying the vibrations to the friction member.

12 Claims, 5 Drawing Sheets

CAMERA MODULE

CROSS REFERENCE TO RELATED APPLICATION(S)

This application claims the benefit of Korean Patent Application No. 10-2009-0076267, filed on Aug. 18, 2009, entitled "CAMERA MODULE", which is hereby incorporated by reference in its entirety into this application.

BACKGROUND OF THE INVENTION

1. Technical Field

The present invention relates to a Lens moving MODULE.

2. Description of the Related Art

Recently, as a mobile device including a mobile phone pursues the goals of miniaturization and slimness, manufacturers are attempting to reduce the size of parts which are to be mounted on the mobile device. In order to realize improved function as well as the miniaturization of the parts mounted on the mobile device, the high-density integration of technology is being applied.

Currently, a general Lens moving MODULE for a mobile device is gradually changed from a type having a fixed focus function to a high specification type having additional functions. The representative additional functions include an auto-focusing function and an optical zoom function. In order to realize the additional functions, a piezoelectric actuator for feeding a lens is essentially required. The simplification, miniaturization, and high performance of the actuator are further required.

The piezoelectric actuator, used to realize the auto-focusing function which is widely applied to the Lens moving MODULE for the mobile device in recent years, representatively includes a voice coil type, a piezoelectric type, and a step motor type.

Currently, the mobile device has been developed such that a variety of functions are combined with each other. Further, in light of the characteristics of the mobile phone, the size limit increases continuously. Hence, several parts which are applied to the mobile phone must also have subminiature size so as to remain competitive. This is also applicable to the Lens moving MODULE.

Thus, the recent piezoelectric actuators applied to the Lens moving MODULE for the mobile device mainly use the voice coil type and the piezoelectric type, because they can advantageously reduce the size.

Each of the voice coil type and the piezoelectric type has advantages and disadvantages. The voice coil type is superior in terms of the cost of materials and a drive circuit, while the piezoelectric type is superior in terms of the size and reliability.

Therefore, the development of a Lens moving MODULE which realizes high performance, miniaturization, and low cost while having the advantages of the above-mentioned types is urgent.

SUMMARY OF THE INVENTION

The present invention is intended to provide a Lens moving MODULE, which realizes miniaturization and low cost, in addition to having a simple structure.

In an exemplary Lens moving MODULE according to an embodiment of the present invention, a lens barrel having at least one lens which brings an image of a subject into focus. A housing having a space for the lens barrel, and friction member formed in axially. A piezoelectric actuator provided in an outer circumferential surface of the lens barrel, and generating vibration when external voltage is applied to the piezoelectric actuator, with a through hole formed for having the friction member. An elastic member include the friction member, and inserted into the through hole of the piezoelectric actuator, and applying the vibrations to the friction member.

The elastic member is shaped such that an inner portion thereof is convex.

An auxiliary guide protrudes from the outer circumferential surface of the lens barrel, thus preventing the lens barrel from being inclined when the lens barrel is driven up and down.

The Lens barrel comprising A protruding part for including the piezoelectric actuator The auxiliary guide is opposite to the protruding part.

The auxiliary guide formed two or three in the same intervals.

The auxiliary guide is quadrangle shape.

The piezoelectric actuator is quadrangle shape or round shape.

The piezoelectric actuator is designed to be perpendicular to a plane in such a way as to be equal to the formation direction of the through hole 113, thus allowing the lens barrel 110 to be easily driven up and down.

The friction member is cylinder shape, and formed in axially.

The outer dimension of the friction member is same as the inner dimension of the elastic member.

The elastic member is ring shape spring.

DESCRIPTION OF THE PREFERRED EMBODIMENTS

Figure 1:
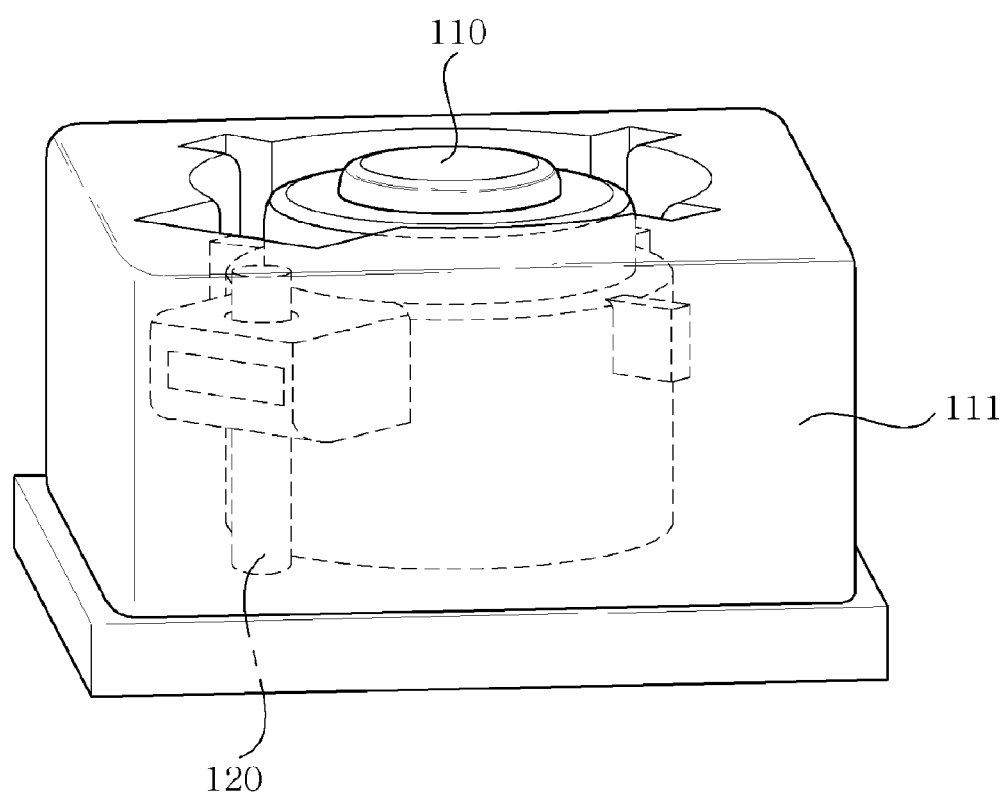
FIG. 1 is a perspective view illustrating an entire Lens moving MODULE according to the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the terms to describe most appropriately the best method he or she knows for carrying out the invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention might obscure the gist of the present invention, the detailed description thereof will be omitted.

Hereinafter, the preferred embodiment of the present invention will be described in detail with reference to the accompanying drawings.

As shown in FIGS. 1 to 6, the present invention is directed to a Lens moving MODULE 100 having a piezoelectric actuator. The Lens moving MODULE 100 is provided with a lens barrel 110, a housing 111, a friction member 120, a piezoelectric actuator 130, and an elastic member 140.

The lens barrel 110 is provided with one or more lenses which brings an image of a subject into focus, and is driven up and down to adjust the focus.

The present invention is intended to realize the miniaturization of the Lens moving MODULE 100, in addition to allowing the lens barrel 110 to be easily driven up and down.

The lens barrel 110 having the piezoelectric actuator 130, for example, A protruding part 112 protrudes integrally from a predetermined portion of the outer circumferential surface of the lens barrel 110 in such a way as to be stepped, and the protruding part 112 includes the piezoelectric actuator 130.

The housing 111 surrounds and supports the outer circumference of the lens barrel 110, and A friction member 120 in the shape of a cylindrical bar is integrally provided in the housing 111. The friction member 120 is fitted into a through hole 113 of the piezoelectric actuator 130. The coupled shape of the friction member 120 with the piezoelectric actuator 130 will be described below in detail.

The piezoelectric actuator 130 is installed in the protruding part 112. The through hole 113 is formed at a node point located at the center in the piezoelectric actuator 130 having the smallest displacement.

When external voltage is applied to the piezoelectric actuator 130, the piezoelectric actuator 130 contracts or expands, thus generating bending displacement. Vibrations resulting from momentary movement of the bending displacement cause the lens barrel 110 to be driven up and down.

Since the shape of the piezoelectric actuator 130 is not subject to any specific limitation, the piezoelectric actuator 130 may have the shape of a rectangle, a square or a circle. Further, because the piezoelectric actuator 130 generates mechanical vibrations thanks to external voltage applied thereto, the piezoelectric actuator 130 may be manufactured to have high reliability and small size. Thus, this helps to realize the miniaturization of the Lens moving MODULE.

The piezoelectric actuator 130 applies a pulse-type voltage in the ultrasonic range to the Lens moving MODULE 100, so that it is possible to precisely adjust a position according to the linear motion and duty ratio (the fraction of time when a pulse is on during one cycle) of voltage applied to the piezoelectric actuator 130.

Further, the piezoelectric actuator 130 is installed in the protruding part 112 of the lens barrel 110, thus minimizing the separation of parts from the piezoelectric actuator 130 when it receives an impact from its outside. Consequently, such a construction provides a Lens moving MODULE which is simple and stable.

Figure 2:
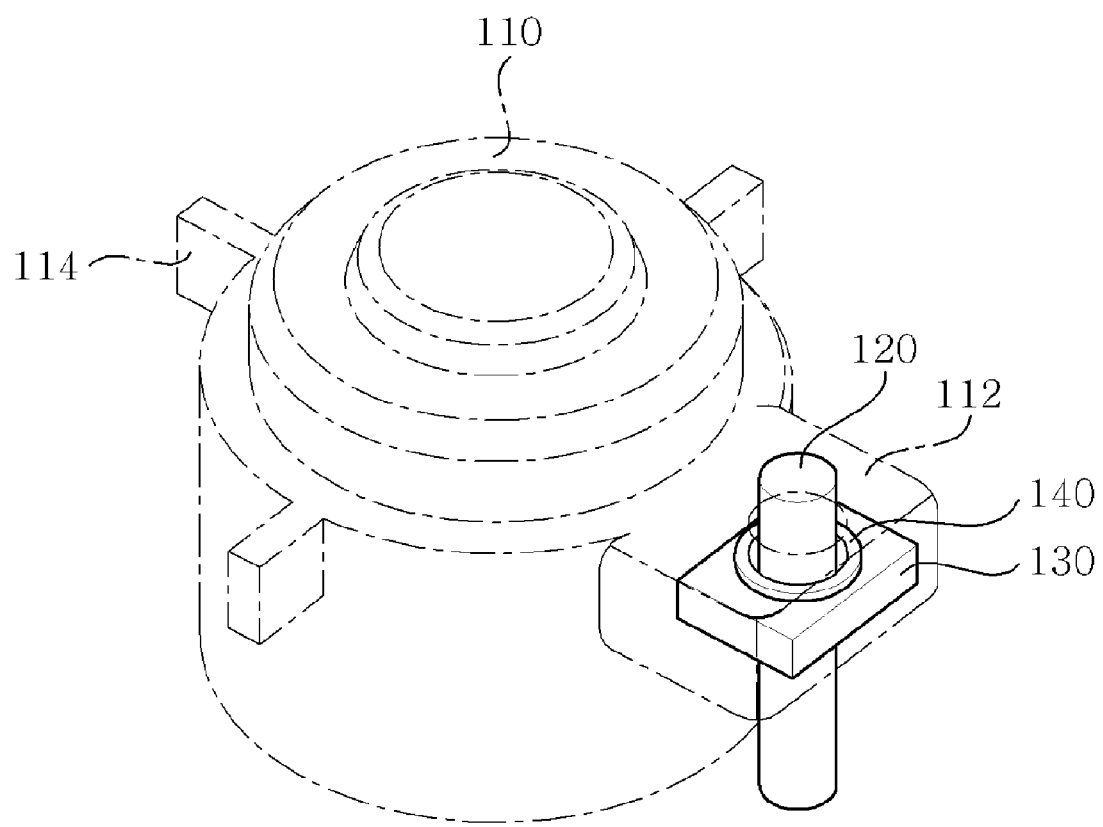
FIG. 2 is a perspective view illustrating a portion of the Lens moving MODULE according to the present invention.
Figure 3:
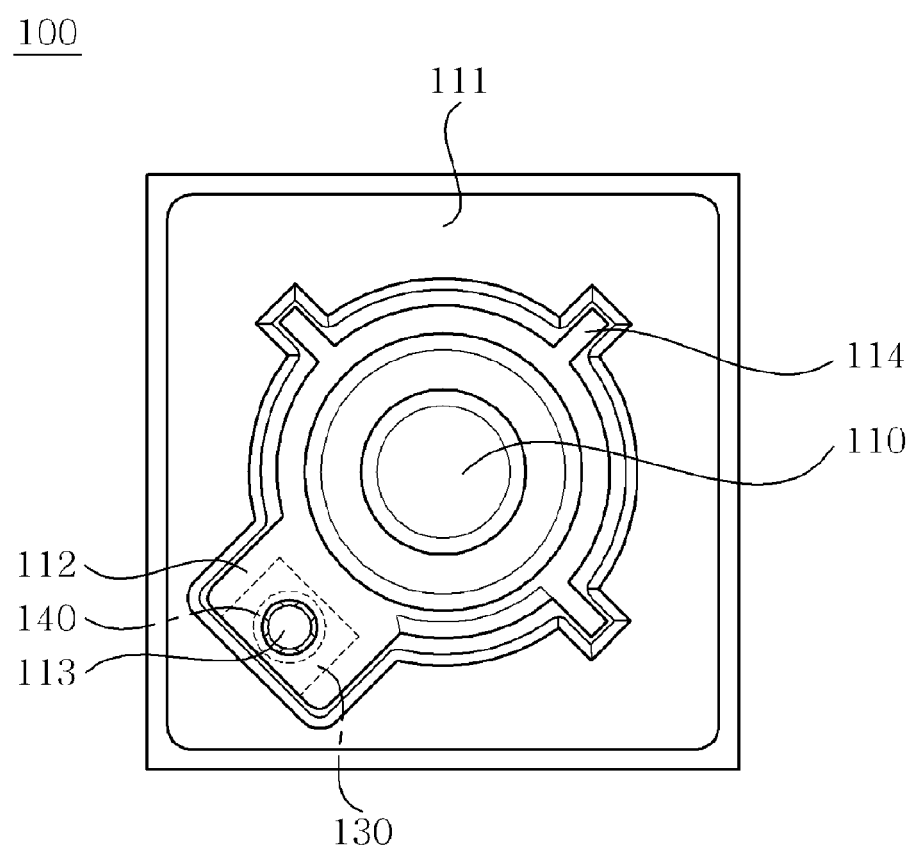
FIG. 3 is a top plan view illustrating the Lens moving MODULE according to the present invention.

As shown in FIGS. 2 and 3, an auxiliary guide 114 protrudes from the outer circumferential surface of the lens barrel 110 in such a way as to be stepped.

The auxiliary guide 114 functions to prevent the lens barrel 110 from being inclined when the lens barrel 110 moves up and down. The shape of the auxiliary guide 114 is determined depending on the structure of a system.

Here, the shape and number of the auxiliary guide 114 are not subject to any specific limitations. In order to balance the lens barrel 110, it is most preferable that three rectangular auxiliary guides 114 be formed at regular intervals.

Figure 4:
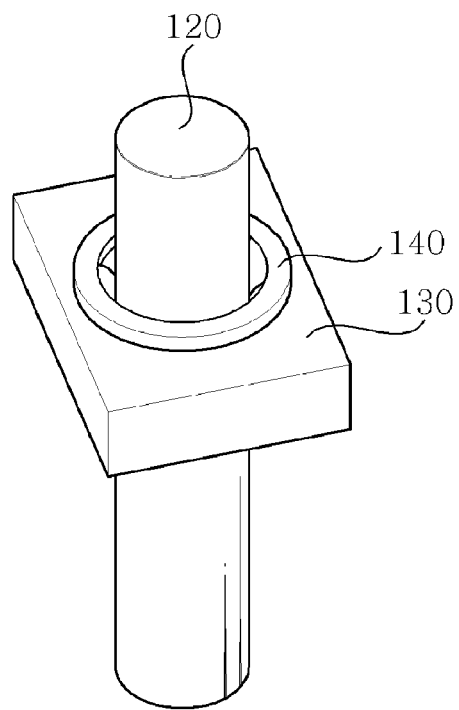
FIG. 4 is a perspective view illustrating a portion of the Lens moving MODULE according to the present invention.

Referring to FIGS. 3 and 4, the elastic member 140 in the shape of a ring, having an outer diameter which is equal to an inner diameter of the through hole 113, is inserted into the through hole 113 which is formed in the central portion of the piezoelectric actuator 130.

The cylindrical bar shaped friction member 120 formed integrally with the housing 111 is accommodated in the elastic member 140. When the elastic member 140 is subjected to pre-pressure from vibrations of the piezoelectric actuator 130, the elastic member 140 drives the lens barrel 110 up and down along the axis of the friction member 120.

Figure 5:
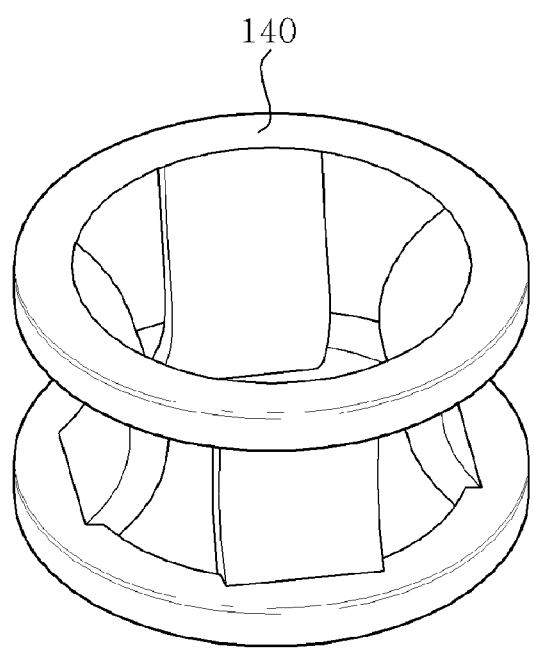
FIG. 5 is an enlarged view illustrating an elastic member of the Lens moving MODULE according to the present invention.

FIG. 5 is an enlarged view illustrating the elastic member 140. The elastic member 140 has a convex shape so that it can be inserted into the central hole of the piezoelectric actuator 130. Preferably, the elastic member 140 is in the shape of a ring.

The elastic member 140 is a pre-pressure means which transmits vibrations from the piezoelectric actuator 130 to the friction member 120 inserted into the central portion of the piezoelectric actuator 130, thus driving the lens barrel 110 up and down along the axis of the friction member 120.

Here, the elastic member 140 has the shape of a ring, the inner portion of which is convex, so as to efficiently transmit vibratory force to the friction member 120 held in the elastic member 140.

Figure 6:
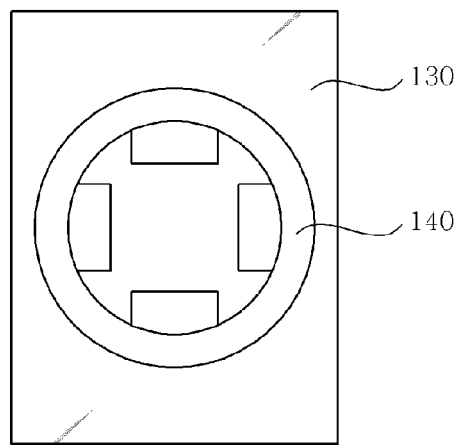
FIG. 6 is a view illustrating a portion of the Lens moving MODULE according to the present invention.

FIG. 6 illustrates the shape of the elastic member 140 inserted into the through hole 113 of the piezoelectric actuator 130. Any material may be used as the elastic member 140, as long as the material has elasticity. Preferably, a spring is used as the elastic member 140.

Figure 7:
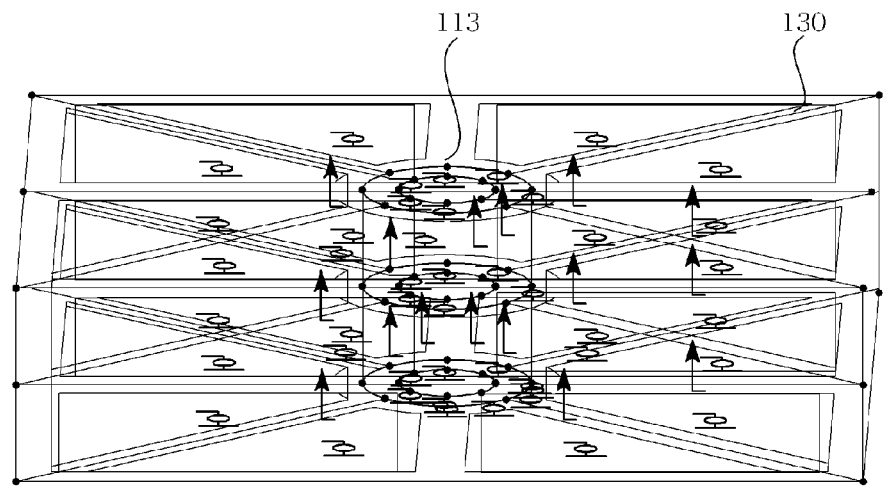
FIG. 7 is a view illustrating the polarization direction of a piezoelectric actuator of the Lens moving MODULE according to the present invention.

As shown in FIG. 7, preferably, the polarization direction of the piezoelectric actuator 130 is designed to be perpendicular to a plane in such a way as to be equal to the formation direction of the through hole 113, thus allowing the lens barrel 110 to be easily driven up and down.

When the piezoelectric actuator 130 comprises two sheets of ceramic, the piezoelectric actuator 130 is preferably designed such that an upper electrode surface is a positive electrode, a middle common surface is a negative electrode, and the lowermost surface is a positive electrode, and current flows in the piezoelectric actuator.

The Lens moving MODULE 100 of the present invention constructed as described above generates vibrations on the piezoelectric actuator 130 by applying an external voltage thereto, and inserts the elastic member 140 such as the spring into the through hole 113 which is formed in the node point, thus applying pre-pressure to the friction member 120 which is held in the through hole 113. When the pre-pressure is applied to the friction member 120, the lens barrel 110 is driven up and down along the axis of the friction member 120.

The Lens moving MODULE 100 of the present invention applies a pulse-type voltage in the ultrasonic range, thus enabling precise position adjustment according to linear motion and the duty ratio of voltage, and minimizing the separation of the piezoelectric actuator and other parts in the case of being impacted externally.

Therefore, the present invention provides a Lens moving MODULE which has a simple structure and realizes the stable feeding of a lens.

As described above, the present invention provides a Lens moving MODULE, in which a piezoelectric actuator generates vibrations when external voltage is applied thereto, and an elastic member is provided in a through hole of the piezoelectric actuator and applies pre-pressure to a friction member inserted into the through hole, thus allowing a lens barrel to be easily driven up and down along the axis of the friction member.

Further, the present invention provides a Lens moving MODULE, which applies a pulse-type voltage in the ultrasonic range, thus enabling precise position adjustment according to linear motion and the duty ratio of voltage, and minimizing the separation of a piezoelectric actuator and other parts against external impact.

Furthermore, the present invention provides a Lens moving MODULE, which includes a piezoelectric actuator having large displacement, thus enabling the miniaturization of the piezoelectric actuator and reducing manufacturing cost. Consequently, the present invention provides a Lens moving MODULE which has a simple structure and realizes the stable feeding of a lens.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood as falling within the scope of the present invention.

What is claimed is:

1. A camera module, comprising:
    a lens barrel having at least one lens which brings an image of a subject into focus;
    a housing having a space for the lens barrel, and a friction member formed in axially;
    a piezoelectric actuator provided in an outer circumferential surface of the lens barrel, and generating vibration when external voltage is applied to the piezoelectric actuator, with a through hole formed for having the friction member; and
    an elastic member including the friction member and in the shape of a ring and giving a pre-pressure to the friction member, and inserted into the through hole of the piezoelectric actuator, and applying the vibrations of the piezoelectric actuator to the friction member held in the elastic member.

2. The camera module as set forth in claim 1, wherein the elastic member is shaped such that an inner portion thereof is convex.

3. The camera module as set forth in claim 1, wherein an auxiliary guide protrudes from the outer circumferential surface of the lens barrel, thus preventing the lens barrel from being inclined when the lens barrel is driven up and down.

4. The camera module as set forth in claim 3, wherein the Lens barrel comprises a protruding part for including the piezoelectric actuator.

5. The camera module as set forth in claim 4, wherein the auxiliary guide opposite to the protruding part.

6. The camera module as set forth in claim 4, wherein the auxiliary guide formed two or three in the same intervals.

7. The camera module as set forth in claim 4, wherein the auxiliary guide is quadrangle shape.

8. The camera module as set forth in claim 1, wherein the piezoelectric actuator is quadrangle shape or round shape.

9. The camera module as set forth in claim 1, wherein the piezoelectric actuator is designed to be perpendicular to a plane in such a way as to be equal to the formation direction of the through hole, thus allowing the lens barrel to be easily driven up and down.

10. The camera module as set forth in claim 1, wherein the friction member is cylinder shape, and formed in axially.

11. The camera module as set forth in claim 1, wherein the outer dimension of the friction member is same as the inner dimension of the elastic member.

12. The camera module as set forth in claim 1, wherein the elastic member is ring shape spring.

* * * * *